US006223157B1

(12) United States Patent
Fisher et al.

(10) Patent No.: US 6,223,157 B1
(45) Date of Patent: Apr. 24, 2001

(54) METHOD FOR DIRECT RECOGNITION OF ENCODED SPEECH DATA

(75) Inventors: Thomas D. Fisher, Plano; Jeffery J. Spiess, Lewisville; Dearborn R. Mowry, Irving, all of TX (US)

(73) Assignee: DSC Telecom, L.P., Plano, TX (US)

( * ) Notice: Subject to any disclaimer, the term of this patent is extended or adjusted under 35 U.S.C. 154(b) by 0 days.

(21) Appl. No.: 09/074,726

(22) Filed: May 7, 1998

(51) Int. Cl.[7] .................................................. G10L 19/04
(52) U.S. Cl. .......................... 704/250; 704/219; 704/275
(58) Field of Search ..................................... 704/200, 231, 704/270, 275, 219, 223, 221, 250, 255, 246, 251

(56) References Cited

U.S. PATENT DOCUMENTS

| 5,297,194 | * | 3/1994 | Hunt et al. ............................. 379/88 |
| 5,305,421 | * | 4/1994 | Li ......................................... 395/2.28 |
| 5,377,301 | * | 12/1994 | Rosenberg et al. ................. 395/2.31 |
| 5,487,129 | * | 1/1996 | Paiss et al. .......................... 395/2.42 |
| 5,680,506 | * | 10/1997 | Kroon et al. ......................... 704/203 |
| 5,692,104 | * | 11/1997 | Chow et al. ......................... 704/253 |
| 5,787,390 | * | 7/1998 | Quinquis et al. .................... 704/219 |
| 6,003,004 | * | 12/1999 | Hershkovits et al. ............... 704/253 |

OTHER PUBLICATIONS

IEEE International Conference on Multimedia Computing and Systems '97. Yapp et al, "speech recognition on MPEG/AUdio encoded files". P. 624–625. Jun. 1997.*

* cited by examiner

Primary Examiner—Richemond Dorvil
(74) Attorney, Agent, or Firm—Jackson Walker L.L.P.

(57) ABSTRACT

Digital Cellular telephony requires voice compression designed to minimize the bandwidth required for the digital cellular channel. The features used in speech recognition have similar components to those used in the vocoding process. The present invention provides a system that bypasses the de-compression or decoding phase of the vocoding and converts the digital cellular parameters directly into features that can be processed by a recognition engine. More specifically, the present invention provides a system and method for mapping a vocoded representation of parameters defining speech components, which in turn define a particular waveform, into a base feature type representation of parameters defining speech components (e.g. LPC parameters), which in turn define the same digital waveform.

21 Claims, 4 Drawing Sheets

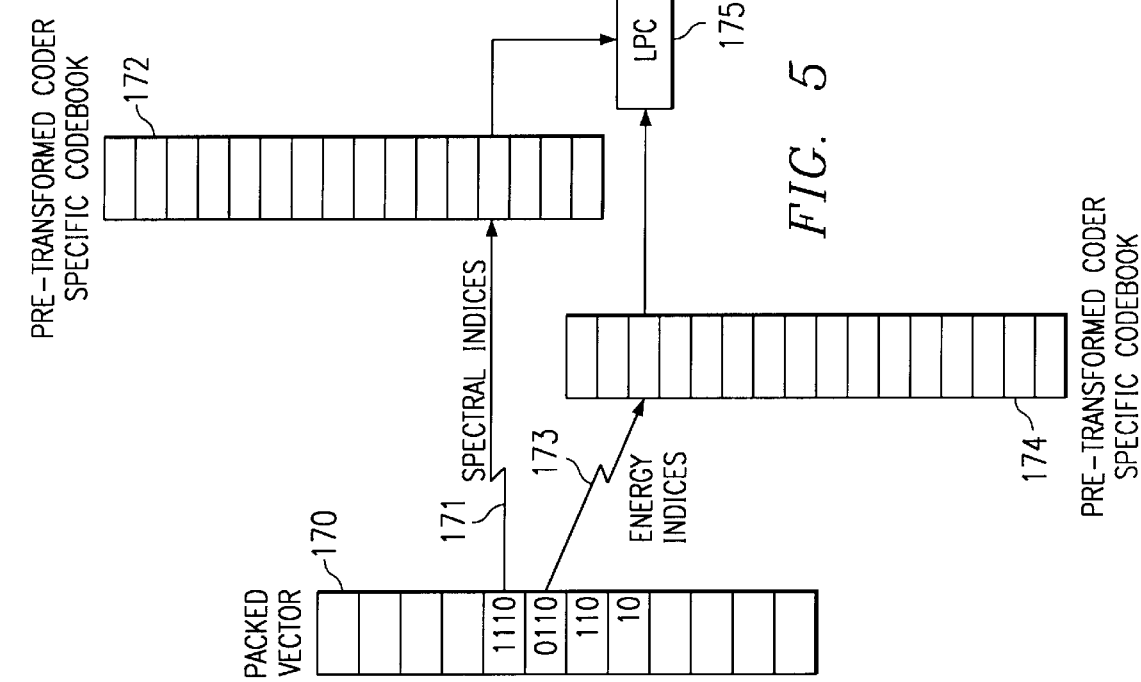
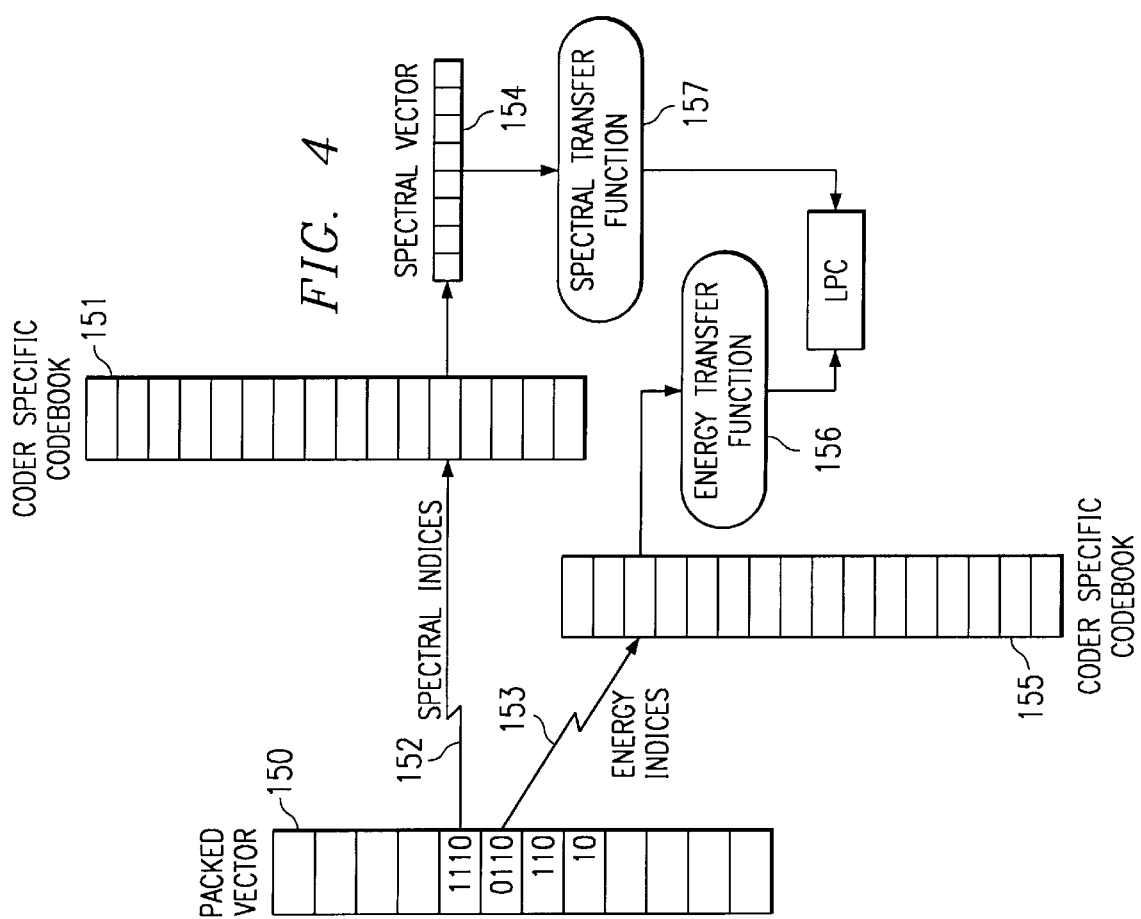

METHOD FOR DIRECT RECOGNITION OF ENCODED SPEECH DATA

FIELD OF THE INVENTION

The present invention relates to a method for providing robust speech recognition of encoded (or compressed) speech data.

BACKGROUND INFORMATION

Speech recognition, the machine translation of spoken utterances into a stream of recognized words or phrases, has received considerable attention from researchers in recent years. In the last decade, speech recognition systems have improved enough to become available to an ever larger number of consumers in the market place.

A number of applications utilizing speech recognition technology are currently being implemented in the telephone network environment, including the digital cellular network environment. For example, a telephone user's spoken commands may now determine call routing or how a call is billed (e.g.,"collect call please" or "calling card"). Similarly, a telephone user may transact business by dialing a merchant's automated system and speaking a credit card number instead of dialing one. Further and future use of speech recognition technology in the digital cellular environment could enhance service in a limitless number of ways.

The Internet, which has also grown and become more popular in recent years, provides another environment in which subscribers may benefit extensively from further use of speech recognition technology. For example, in the future, commercially available systems may allow a user at a remote station to specify, via voice commands, instructions which are then transmitted to an Internet host and executed.

However, Internet connection lines and digital cellular channels have limited transmission capacity with respect to audio or real-time speech. As a result, applications which involve real-time processing of large amounts of speech data over these mediums will often require data compression (or data encoding) prior to transmission. For example, the low bandwidth requirement for the digital cellular medium requires the use of voice data compression that can compress from 5-to-1 to 10-to-1 depending on the compression algorithm used. Compression algorithms used in some Internet browsers operate in this range as well.

Thus, in the network environment, voice data must often be compressed prior to transmission. Once the data reaches a speech recognition engine at a remote site, the limited network bandwidth is no longer a factor. Therefore, it is common practice to de-compress (or decode and reconstruct) the voice data at that point to obtain a digital representation of the original acoustic signal (i.e., a waveform). The waveform can then be processed as though it was originally generated at the remote site. This procedure (i.e., compress-transmit-decompress) allows speech recognition applications to be implemented in the network environment and overcomes issues relating to bandwidth limitation.

However, there are a number of disadvantages associated with this procedure. Specifically, it generally involves redundant processing steps as some of the work done during compression is repeated by the recognition "front-end" processing.

Specifically, much of the speech compression done today is performed by "vocoders." Rather than create a compressed, digital approximation of the speech signal (i.e., an approximation of a waveform representation), vocoders instead construct digital approximations of components or characteristics of speech implied by a given speech model. For example, a model may define speech as frequency of vocal chord movement (pitch), intensity or loudness of vocal chord movement (energy) or resonance of the vocal tract (spectral). The vocoding algorithm then applies signal processing techniques to the speech signal, leaving only specific signal components including those measuring pitch, energy and spectral speech characteristics.

In similar fashion, a speech recognition system operates by applying signal processing techniques to extract spectral and energy information from a stream of in-coming speech data. To generate a recognition result the extracted speech components are converted into a "feature" and then used in the alignment sub-system where the in-coming feature is compared to the representative features of the models.

Thus, when vocoded speech data is reconstructed into a waveform signal (decompressed) prior to speech recognition processing, speech components (or features) are effectively computed twice. First, during compression, the vocoder will decompose the original (digitized) signal into speech components. Then, during recognition processing, if the incoming data is a reconstructed waveform, the recognition facility must again extract the same or similar features from the reconstructed signal.

Obviously, this procedure i's not optimally efficient. This is particularly true when the step of determining features from the reconstructed signal (i.e., its digital representation) involves significant computational resources and added processing time.

SUMMARY OF THE INVENTION

Accordingly, one advantage of the present invention is that it saves processing time and computational resources by bypassing redundant decompression processing.

Another advantage of the present invention is that it takes advantage of processing already performed during vocoding (i.e., speech data compression).

Another advantage of the present invention is that it renders speech recognition applications practiced in a network environment less complex.

In short, the present invention overcomes the disadvantages of the above described procedure (compress-transmit-decompress). More specifically, the present invention provides a system and method for mapping a vocoded representation of parameters defining speech components, which in turn define a particular waveform, into a base feature type representation of parameters defining speech components (e.g., Linear Predictive Coding ("LPC")), which in turn define the same digital waveform. This conversion is accomplished through a transform algorithm which is developed prior to system operation, but is executed during operation.

As a result, during operation, construction of the base feature type used in recognition does not require reconstruction of the waveform from vocoded parameters.

BRIEF DESCRIPTION OF DRAWINGS

FIG. 4 is an operational diagram of the process of FIG. 3 whereby the Digital Signal Processing Front End steps convert vocoded data directly into LPC vectors.

FIG. 5 is an operational diagram showing preconditioned codebooks being used to construct LPC vectors in accordance with an exemplary embodiment of the present invention.

Detailed Description of the Invention

Figure 1:
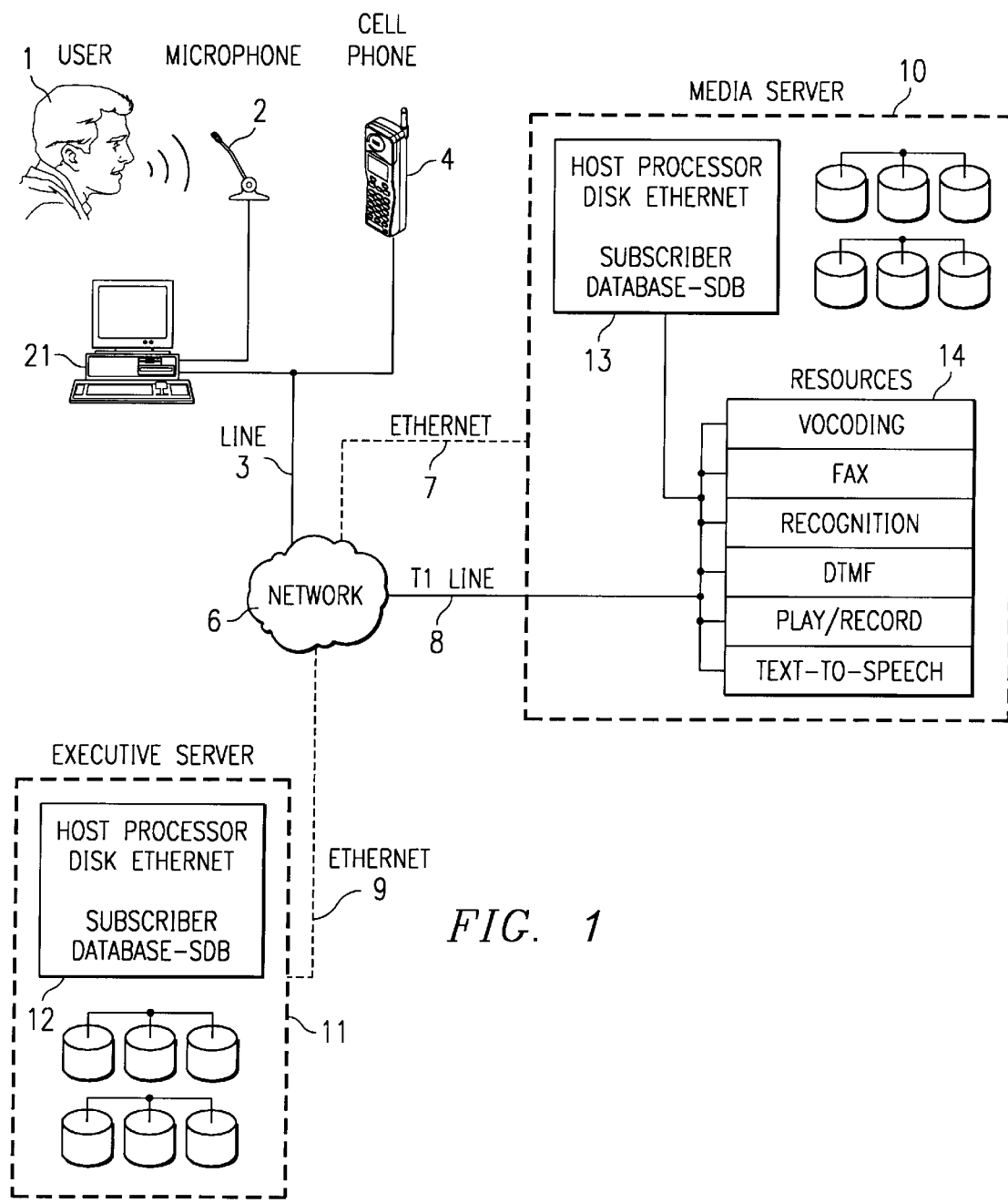
FIG. 1 depicts an overall system architecture of an exemplary telecommunications network system within which the present invention may be implemented.

Turning now to the figures and initially to FIG. 1, there is illustrated an overall system architecture of an exemplary telecommunications network system within which the present invention may be implemented. This figure does not show a number of network system specific components (e.g. Internet specific or cellular network specific components) in order to clearly illustrate the broad context in which the present invention may be implemented.

According to FIG. 1, an end user 1 initially accesses a telecommunications network 6 with remote equipment (e.g., a client workstation 21 including microphone 2 or a cellular phone 4). Specifically, once the application utilizing speech recognition is initiated the speaker 1 speaks into the cellular phone 4 or a microphone 2 of the client station 21. The application may be, for example, voice determined call routing or transmitting over the Internet digitized voice commands which are then executed at a host, interior gateway or exterior gateway.

The resulting acoustic signal is converted into an electric signal and digitized with an analog-to-digital converter. The digitized speech data is then "vocoded" (i.e., the data is compressed) using a vocoding algorithm. This algorithm may be performed, for example, by a processing device in the cellular phone 4 or by a software component of an Internet browser (e.g., Microsoft "Explorer" (TM) or "Netscape Communicator" (TM)) running on the client workstation 21.

The compressed data is transmitted over a line 3 through the telecommunications network 6 (e.g., the Internet or a digital cellular network), through an Ethernet 7 (i.e. a local area network) or a T1 line 8, for example, and finally to a Media Server 10. The Media Server 10 might be located in, for example, a GSM cellular network at a Mobile Telephone Switching Office ("MTSO"). The MTSO is the heart of the network and contains subscriber information databases, including authentication, billing and perhaps phone number logs (for voice identification of call destination). The Media Server 10 might also be located at an Internet destination host, which receives vocoded speech data and generates a recognition result.

In accordance with the application running on the Media Server 10, the vocoded speech data is processed by a recognition engine to generate a recognition result. In doing so, the recognition engine may use resources and language models stored either locally (i.e. at the Media Server 10) or remotely (at what might be called, for example, an "Executive Server" 11).

Figure 2:
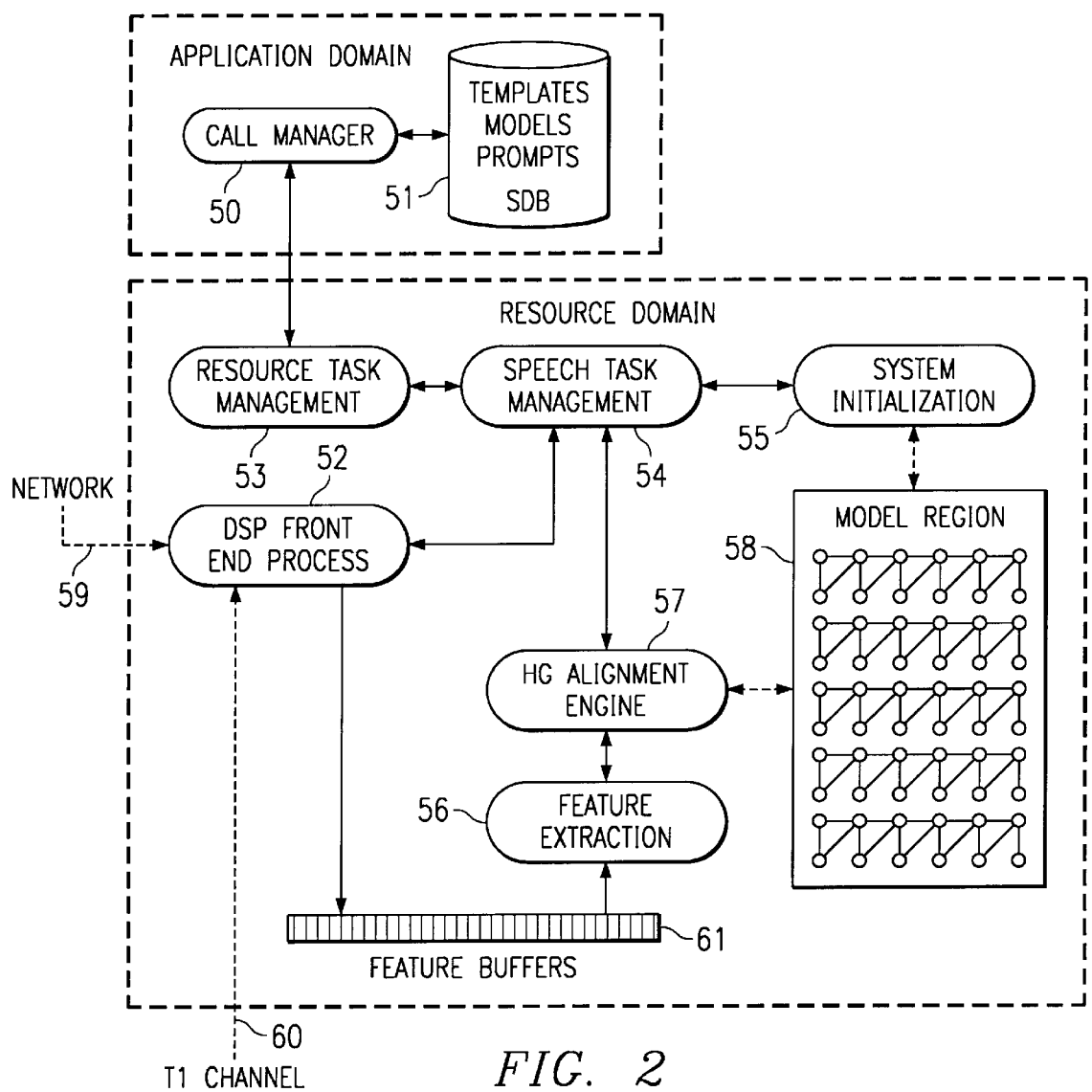
FIG. 2 depicts recognition and application systems located on the Media Server shown in FIG. 1, in accordance with an exemplary embodiment of the present invention.

Turning now to FIG. 2, it broadly depicts resource and application processes located on the Media Server shown in FIG. 1, which also include the method of the present invention.

For the purpose of illustrating these processes, it will be assumed that the application that is executing is a telephone number dialing service determined by voice commands (e.g., "call Bob") from a cellular service subscriber 1.

The subscriber 1 initially navigates through a series of prompts or menus (e.g., "press 1 for voice dialing") sent from the Call Manager 50 in the application domain (on the Media Server 10). The user 1 may accomplish this by, for example, pressing digits on the cellular phone 4 key pad.

Once voice dialing is selected, the user 1 may for example speak the name of the party to call into the cellular phone 4 (e.g., "Bob"). As noted earlier, the acoustic signal is vocoded.

The speech signal passes through the cellular network 6 to the Digital Signal Processor Front End Process ("DSPFE") 52 in the resource domain (on the Media Server 10). In the exemplary embodiment, the DSPFE 52 obtains standard acoustic vectors (e.g., LPC vectors), from incoming (digitized and compressed) speech data without decompression.

LPC vectors are a standard in the field of speech recognition and contain parameters (values) for various components used in the Linear Predictive Coding speech model. That model defines speech as resulting from glottal pulses causing excitation of the vocal tract, which is viewed as a lossless tube. Given these assumptions, speech may be broken down into components (e.g., magnitude of the glottal pulses, and vocal tract resonance which can be measured by the envelope of the power spectra). An LPC vector contains parameter values for these components at given instances in time, with specific portions of the LPC vector assigned to represent specific speech components (e.g., energy, spectral).

As compressed speech data is continually passed to the DSPFE 52, the DSPFE 52 generates LPC vectors (or other base feature type common to a plurality of recognition systems) each representing the waveform at periods in time. The speech recognition system uses the components of these vectors to ultimately generate a recognition result.

In the exemplary embodiment, the speech recognition alignment sub-system may execute in a different processor or processor context. As a result, the DSPFE 52 sends the generated LPC vectors to the feature buffers 61. The use of such buffers, which allow two independent processes to share information is well known in the art.

Turning now to the speech recognition processing, when the user 1 chooses voice dialing via the call manager 50, the call manager 50 accesses the resource domain (including speech task resources) via the Resource Task Manager 53. The Resource Task Manager 53, manages a number of resources in the resource domain, including the speech recognition facility. A recognition system of the type described here could execute on a general purpose processor (e.g. Sparc) or an embedded system (e.g., the MPB).

As the relevant application is voice dialing, the Resource Task Manager 53 activates the Speech Management Task 54, which manages the speech recognition facility.

The Speech Task Manager 54 then causes initialization of the speech recognition facility and its application models 58. The application models 58 are databases of lexicon and language models which are speaker independent and built using the techniques known to those with skill in the art. *Speech Communications: Human and Machine,* O'Shaughnessy, pp. 497, (Addison Wesley 1990).

The Speech Task Management 54 also manages an Alignment Engine 57, which draws features from the Feature Extraction Process 56 and compares them with features in the application models 58. The Feature Extraction Process 56, in turn, draws LPC vectors from the Feature Buffers 61, and converts the LPC vectors to specific features which are actually used by the Alignment Engine 57 to generate a recognition result.

Again, this feature extraction from LPC vectors is well researched in the art. *Voice Speech Processing,* Parsons, pp 182 (McGraw Hill 1987). The specific feature vectors extracted from the LPC data depends on the recognition system used and upon a variety of design and implementational considerations.

Using the feature vectors obtained from the Feature Extraction Process 56, the Alignment Engine 57 compares these features to features in the Model Region 58 to generate a recognition result.

Thus, both the DSPFE 52 and the Speech Task Management 54 (which, again, manages the speech recognition facility) continue as above as independent processes sharing LPC vectors via the feature buffers 61. These processes terminate when the task is complete (i.e., the system has processed the digital representation of a spoken "Bob" and recognized the word "Bob" for use in voice dialing).

Once the recognition result is generated, the Speech Task Management 54 returns the result (the word "Bob") to the Resource Task Management 53, which then returns the result to the Call Manager 50. The Call Manager 50 then compares the recognition result to a database of telephone number records specific to user 1 (which may be located in the subscriber database 51) until a record with a name field containing "Bob" is found. The Call Manager 50 then finds the telephone number contained in that record and the call is connected and routed, accordingly.

While the above broadly describes the DSPFE 52 recognition processes, the following provides a more detailed explanation of the method of the present invention.

Figure 3:
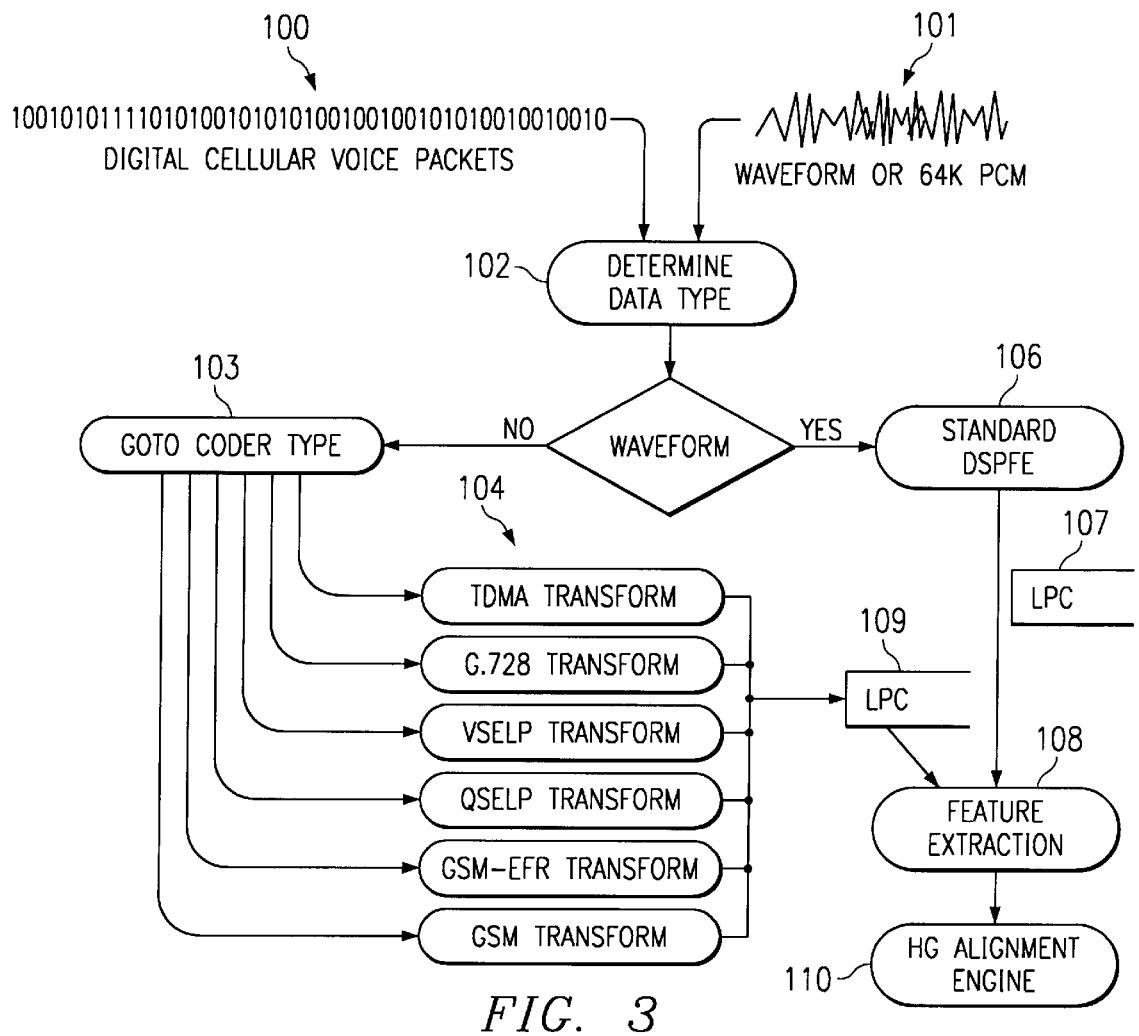
FIG. 3 is a flow chart of a process performed by the Digital Signal Processor front end shown in FIG. 2, in accordance with an exemplary embodiment of the present invention.

Turning now to the flowchart of FIG. 3, the procedure performed by the Digital Signal Processing Front-End ("DSPFE") of FIG. 2 is shown in further detail. As noted above in connection with FIG. 2, the speech signal data passes to the DSPFE process 52 which generates LPC vectors.

To do so, the DSPFE 52 performs the following. In step 102 of FIG. 3, the DSPFE 52 initially determines the type of digitized speech data incoming. The data may be, for example, either Digital Cellular data packets 100 or standard T1/64k waveform data 101 (although other types of data is, of course possible).

In particular, the waveform data 101 may be, for example, a set of 64K PCM samples that are decompanded to a linear form and processed. "PCM" is an acronym for "Pulse Code Modulation," which is a coding scheme whereby the input waveform is simply sampled and non-linearly quantized. The process of converting to a linear data type at this point is trivial. The data are an uncompressed representation of the speech signal.

The digital cellular data packets 100 are vocoded speech data (i.e., organized to represent isolated speech components according to a speech model, rather than to a representation of that speech signal).

Thus, if in step 102 it is determined that the data is "waveform" then processing continues to step 106, standard DSPFE processing. Because the waveform data 101 is not vocoded (compressed), only the PCM to linear conversion process is necessary. The system can in other words act just as though the original acoustic signal were generated locally.

The standard DSPFE 52 processes the waveform data 101, using techniques known in the art to generate LPC vectors, or any other base feature type common to many recognition systems.

The LPC vectors are placed in feature buffers 61, drawn by the Feature Extraction Process 108, which generates the features used by the recognition engine (these are sometimes called Generalized Speech Features ("GSF")).

On the other hand, if the data is digital cellular 100 (i.e.,"vocoded"), then the system takes advantage of the speech components already isolated in the vocoded data in accordance with the present invention. Because the recognition engine uses such speech components, it is unnecessary to synthesize the resultant digital waveform and then initiate standard DSPFE 52 processing to construct LPC vectors. Instead, in accordance with the present invention, LPC vectors (or other base feature type vectors) are constructed directly from the vocoded data.

While the incoming vocoded data is comprised of speech components (e.g., energy and spectral) which are also used in LPC vectors, the vocoded data are represented as parameter values contained in particular data structures defined by particular bit patterns according to coder type. The data may have been generated using any one of a variety of coders, including, for example, VSELP, QSELP, GSM, GSM-EFR or G.728.

To overcome this problem, in Step 104, the data is processed through a transform which maps the coder representation into, for example, the LPC representation defining the same (or as similar as possible) waveform. As a person of ordinary skill in the art will understand, the particular mapping algorithm will of course depend upon the specific coder type used to code the data.

Once the LPC vectors are constructed, the LPC vector data is placed in feature buffers 61, drawn by the Feature Extraction Process 108, which generates the features used by the recognition engine (i.e., the "GSF"). Thus, the recognition result is generated without decoding (decompressing) the incoming digitized speech signal.

The procedure shown in FIG. 3 whereby the DSPFE 52 converts vocoded data into the corresponding LPC vector without a decompression step, is shown in greater detail in FIG. 4 and FIG. 5.

Turning now to FIG. 4, depending on the coder type, incoming vocoded speech data may be organized in the form of packed vectors 150 (a stream of partitioned binary data) with associated "codebooks." The "codebooks" can be conceptualized as an array of "template" parameters (i.e., scalar or vector) which are potentially speech component parameters (values). The use of such a finite number of templates to represent values in high definition spectrum is called quantization. Here, there is a coder specific codebook with spectral component values 151 and a coder specific codebook for energy component values 158.

Codebooks are designed to work with each specific type of vocoder such that the output of each codebook is a desired representation of one or more vocoder parameters. For example, a particular parameter may be coded nonlinearly, and the codebook for that parameter is designed such that the codebook output is a linear representation of the signal. Another example is a codebook that is designed to produce a logarithmic output.

The collection of codebooks that pertain to the parameters of a particular vocoder are designed using the specific parameter types, quantization methods, and bit allocations of that vocoder. These codebooks are typically provided by or derived from the vocoder design.

It should also be noted that codebooks are being used here only as an example. There is nothing relating to codebooks that in any way precludes the use of non-codebook based vocoders.

Turning again to FIG. 4, typically, the packed vector 150 will contain a set of indices, with designated indices corresponding to particular codebook entries. These indices are used in conjunction with the codebooks, which serve as look-up tables, to select particular speech component parameters contained in the codebook.

Turning now to the spectral speech component, using the corresponding indices in the packed vector 150, in step 154, vectors are chosen from the coder specific spectral codebook to generate a spectral vector at a given point in time. Here, for example, the spectral vector has eight parameters, which again represent the spectral component of the acoustic signal at a given time. In step 157, the parameters are mapped (as close as possible) to a number of parameters in an LPC vector(also an array of parameters) which also define the same spectral component of the same signal at the same time.

The necessary transform (mapping) algorithm may be developed as follows. First, using a particular waveform as input, determine the differences between the vocoded and LPC speech component vector (for example, spectral and energy) defining that waveform at a given time. Next, quantify and generalize these differences. These steps are repeated for a number of different waveforms until the knowledge gained can be used to build a transform mapping the vocoded spectral and energy vector parameters directly into corresponding portions of an LPC vector.

For example, development of the transform for this coder may have shown the spectral parameters in the vocoded spectral vector define the same speech component of the same signal as eight corresponding parameters, twice the magnitude, in an LPC vector. In that case, mapping would merely consist of multiplying the spectral vector parameter values by two and constructing the spectral portion of an LPC vector with the results.

In practice, various techniques known in the art can be employed to generate the transformation matrices required to transform the decoded vocoder parameters into LPC parameters. The complexity of this task and the techniques required depend upon the design of each vocoder. Such techniques as least-squares filter design, autoregressive (AR) modeling, the Levinson-Durbin algorithm, and gradient optimization can be employed if an exact mathematical solution does not exist. These are statistical signal processing techniques that serve to minimize the error between the actual transform output and the desired LPC output.

The process depicted in FIG. 4 is also performed on the energy component of the packed vector 150. In accordance with this procedure, the DSPFE 52 thus processes the energy and spectral components of incoming vocoded data, which are conveniently isolated, to construct LPC vectors without decompression.

Turning now to FIG. 5, a process similar to that shown in FIG. 4 is illustrated. Here, however, the codebooks used are pre-conditioned to automatically map to corresponding LPC vectors. Again, incoming vocoded data is organized in the form of packed vectors 170. Using the packed vector 170, vectors and scalars are chosen from the coder specific spectral and energy codebook. In this case however, the coder specific codebook for spectral related values 172 and a coder specific codebook for energy related values 174 are conditioned to automatically map to corresponding LPC vector parameters. There is no transform step. This procedure provides more efficient transformation, but may add implementational complexity by requiring more extensive modeling to build the codebooks.

The complexity of pre-conditioning of codebooks also depends upon each vocoder design. If the vocoder parameters map easily and distinctly onto the LPC parameters, simple changes in quantization and scaling can be applied to the codebooks. On the other hand, if each of the LPC parameters is a function of multiple codebook parameters, either much larger codebooks are required (solved mathematically), or new codebooks may be developed using similar statistical error minimization methods employed to generate the transforms.

While the above description provides a detailed description of the present invention, it should be apparent that numerous modifications to the above could be made while remaining within the scope of the present invention.

For example, the DSPFE 52 may also bypass the step of constructing LPC vectors by further modeling and pre-conditioning of the codebooks so that the look-up process generates the features use by the recognition engine directly. Although this would considerably simplify front end processing, again, the complexity added to the task of pre-conditioning the look-up tables would be considerable.

What is claimed is:

1. A computer based method for direct recognition of coded speech data, the coded speech data generated by a compression algorithm, the compression algorithm generating from a digitized representation of a speech signal a data representation of a set of one or more speech component vectors, the computer-based method comprising the steps of:

a. transforming the data representation of the set of one or more speech component vectors into a corresponding data representation according to a base feature type, the transforming performed using a mapping algorithm, the mapping algorithm developed by comparing the data representation of the set of one or more speech component vectors defining a waveform with the corresponding data representation according to the base feature type defining the same waveform;

b. obtaining one or more features from the corresponding data presentation according to the base feature type; and c. generating a recognition result in accordance with the one or more features obtained.

2. The computer-based method according to claim 1 wherein the base feature type is a Linear Predictive Coding ("LPC") vector representation.

3. The computer-based method according to claim 1 wherein the compression algorithm is a Vector-Sum Excited Linear Prediction ("VSELP") coding algorithm.

4. The computer-based method according to claim 1 wherein the compression algorithm is a QSELP Quadrature-Sum Excited Linear Prediction ("QSELP") coding algorithm.

5. The computer-based method according to claim 1 wherein the compression method is a Global System for Mobile Communications ("GSM") coding algorithm.

6. The computer-based method according to claim 1 wherein the compression algorithm is a Global System for Mobile Communications—Enhanced Full Rate ("GSM-EFR") coding algorithm.

7. The computer-based method of claim 1 wherein the compression algorithm is a G.728 coding algorithm.

8. A computer-based method for direct recognition of coded speech data, the coded speech data generated by a compression algorithm, the compression algorithm generating from a digitized representation of a speech signal a set of one or more speech component vectors, the set of speech component vectors organized in a packed vector of indices and codebook for each speech component vector, the computer-based method comprising the steps of:

a. generating a sequential data representation of each of the set of one or more speech component vectors from the packed vector and codebook for each component vector;

b. transforming the sequential data representation of each of the set of one or more speech component vectors into a corresponding data representation according to a base feature type;

c. obtaining one or more features from the corresponding data representation according to the base feature type of each of the set of one or more speech component vectors; and d. generating a recognition result in accordance with the one or more features obtained.

9. The computer-based method according to claim 8 wherein the base feature type is a linear predictive coding vector representation.

10. A computer-based method for direct recognition of coded speech data, the coded-speech data generated by a compression algorithm, the compression algorithm generating from a digitized representation of a speech signal one or more speech component vectors, the set of speech component vectors organized in a packed vector of indices and codebook for each speech component vector, the computer-based method comprising the steps of:

a. generating a sequential data representation of each of the set of one or more speech component vectors from the packed vector and codebook for each component vector;

b. transforming the sequential data representation of each of the set of one or more speech component vectors into a corresponding data representation according to base feature type, the transforming performed using a mapping algorithm, the mapping algorithm developed by comparing the sequential data representation of each of the set of one or more speech component vectors defining a waveform with the corresponding data representation according to the base feature type defining the same waveform;

c. obtaining one or more features from the corresponding data representation according to the base feature type of each of the set of one or more speech component vectors; and d. generating a recognition result in accordance with the one or more features obtained.

11. The computer-based method according to claim 10 wherein the base feature type is a Linear Predictive Coding ("LPC") vector representation.

12. A computer-based method for direct recognition of coded speech data, the coded speech data generated by a compression algorithm, the compression algorithm generating from a digitized representation of a speech signal a set of one or more speech component vectors, the set of speech component vectors organized in a packed vector of indices and codebook for each speech component vector, the computer-based method comprising the steps of:

a. generating a data representation of each of the set of one or more speech component vectors according to a base feature type from the packed vector and codebook for each component vector;

b. obtaining one or more features from the data representation of each of the set of one or more speech component vectors according to the base feature type; and c. generating a recognition result in accordance with the one or more features obtained.

13. The computer-based method according to claim 12 wherein the base feature type is a Linear Predictive Coding ("LPC") vector representation.

14. A method for recognition of speech data, comprising the steps of:

receiving a vocoded speech data signal;

constructing at least one linear predictive code vector directly from the vocoded digital speech data signal;

determining at least one speech feature as a function of the at least one linear predictive code vector;

providing the at least one speech feature to a recognition engine; and recognizing speech data by the recognition engine as a function of the at least one speech feature.

15. A method for recognition of speech data, comprising the steps of:

receiving a vocoded speech data signal, the vocoded speech data signal generated by compressing and coding a speech waveform;

transforming the vocoded speech data signal to at least one linear predictive code vector without reconstructing the speech waveform;

determining at least one speech feature as a function of the at least one linear predictive code vector;

providing the at least one speech feature to a recognition engine; and recognizing speech data by the recognition engine as a function of the at least one speech feature.

16. A method for providing a subscriber with voice determined telephone dialing in a cellular telephone network, the cellular telephone network including a database of telephone records specific to the subscriber, the method comprising the steps of:

receiving a vocoded speech data signal, the vocoded speech data signal generated by compressing and coding a speech waveform;

transforming the vocoded speech data signal to at least one linear predictive code vector without reconstructing the speech waveform;

determining at least one speech feature as a function of the at least one linear predictive code vector;

providing the at least one speech feature to a recognition engine;

recognizing speech data by the recognition engine as a function of the at least one speech feature;

searching the telephone records specific to the subscriber for a record with data matching the speech data; and connecting a telephone call in accordance with a telephone number found in a record with data matching the speech data.

17. The method of claim 16 wherein the cellular telephone network is a Global System for Mobile Communications network.

18. A method for executing at an Internet site voice commands of a user at a remote Internet workstation, the method comprising the steps of:

receiving a speech data signal at the Internet workstation;

digitizing the speech data signal;

vocoding the digitized speech data signal;

transmitting the vocoded speech data signal to the Internet site;

receiving the vocoded speech data signal at the Internet site;

transforming the vocoded speech data signal to at least one linear predictive code vector without reconstructing the speech waveform;

determining at least one speech feature as a function of the at least one linear predictive code vector;

providing the at least one speech feature to a recognition engine;

determining by the recognition engine speech data as a function of the at least one speech feature; and executing a command at the Internet site in accordance with the speech data.

19. The method of claim 18 wherein the Internet site is an Internet host.

20. The method of claim 18 wherein the Internet site is an interior gateway.

21. The method of claim 18 wherein the Internet site is an exterior gateway.

* * * * *